April 4, 1961  E. C. WITTKE  2,978,622
POSITION SERVO SYSTEM
Filed Oct. 28, 1959  2 Sheets-Sheet 1

INVENTOR
ERNEST C. WITTKE
BY
ATTORNEY

April 4, 1961    E. C. WITTKE    2,978,622
POSITION SERVO SYSTEM
Filed Oct. 28, 1959    2 Sheets-Sheet 2

INVENTOR
ERNEST C. WITTKE
BY
ATTORNEY

United States Patent Office 2,978,622
Patented Apr. 4, 1961

2,978,622

POSITION SERVO SYSTEM

Ernest C. Wittke, Westbury, N.Y., assignor to Sperry Rand Corporation, Great Neck, N.Y., a corporation of Delaware Filed Oct. 28, 1959, Ser. No. 849,348

7 Claims. (Cl. 318—31)

This invention relates to servo systems and particularly to servo systems utilizing a torque motor to drive a load a predetermined distance without overshooting or hunting.

For purposes of this disclosure, a torque motor may be defined as an A.C. or D.C. motor that is operated in the stalled condition to produce a torque proportional to the applied signal independent of the velocity of the motor.

In certain servo applications, for example in the gyroscopic field, it is desirable to use torque motors to drive the gyroscope gimbals since this type of motor drive has excellent dynamic response characteristics over a wide frequency range and when utilized with the present invention provides extremely tight control. Since torque motors operate in a stalled condition they do not experience a velocity limit as do more conventional servomotors. Consequently, when it is desired to drive a gimbal or other load a predetermined distance without overshoot, it is necessary to provide some means for accurately controlling the torque applied by the torque motor.

It is therefore a primary object of the present invention to provide a servo system utilizing a torque motor with means for accurately controlling the torque applied by the motor to the load to effect precise control of the load.

It is a further object of the present invention to provide a servo system utilizing a torque motor with means for precisely balancing the accelerating torque against the decelerating torque to accurately position the load.

It is a further object of the present invention to provide a system utilizing a torque motor with a device for limiting the accelerating torque applied by the motor over a first predetermined distance while permitting the motor to apply maximum decelerating torque over the remaining distance in order that the integral of the acceleration equals that of the deceleration experienced by the load to position the load precisely.

The above objects are accomplished in a servo system utilizing a torque motor by comparing the polarity of a resultant error signal having displacement and rate components with the direction of rotation of the load. When they are in phase with each other, the resultant error signal applied to energize the torque motor is limited thereby limiting the accelerating torque applied by the motor to the load over a first predetermined portion of the total distance through which the load is driven. When they are in phase opposition with respect to each other, the resultant signal is unlimited thereby energizing the torque motor to provide maximum decelerating torque over the remaining portion of the total distance. The integral of the accelerating torque is arranged to be equal to the integral of the decelerating torque thereby positioning the load accurately without overshooting or hunting. Alternatively, the invention may be considered as limiting the accelerating torque produced by the torque motor to a first predetermined amplitude over a first predetermined distance and limiting the decelerating torque to a second predetermined amplitude over a second predetermined distance whereby the sum of the accelerating torque is equal to the sum of the decelerating torque in order to accurately drive a load a predetermined distance.

Referring to the drawings.

Figure 1:
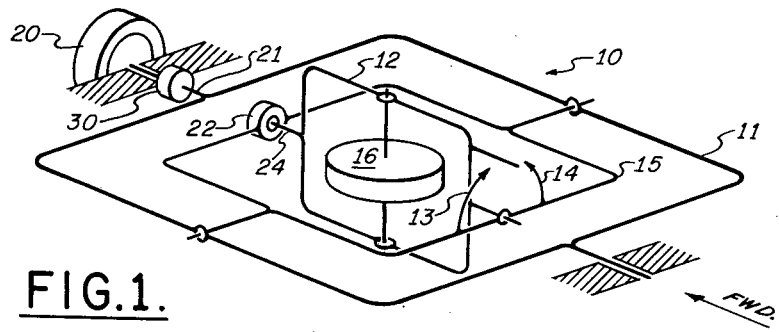
Fig. 1 is a schematic diagram of a gyroscopic stable platform to which the invention is applied.

The present invention will now be described for purposes of example with respect to a gyroscopic stable platform as shown in Fig. 1. A more detailed description of the stable platform per se may be had by referring to U.S. Patent No. 2,591,697, issued April 8, 1952, entitled Stable Reference Apparatus, of R. F. Hays, Jr.

In the stable platform 10 of Fig. 1, it is necessary to provide a drive for the outer roll gimbal 11 capable of rotating the gimbal 11 rapidly through 180° as the pitch attitude of the aircraft (not shown) within which the stable platform 10 is mounted passes through 90° in an upward direction or 90° in a downward direction. During the period of 180° reversal, the roll attitude changes of the aircraft are stored as a rotation of the inner roll gimbal 12. Since compact design of the stable platform 10 requires that the inner gimbal 12 have a restricted freedom, it is necessary that the drive system for the outer gimbal 11 be capable of providing the 180° reversal without overshoot in order to prevent the inner roll gimbal 12 from striking the stops 13 and 14 which are mounted on the pitch gimbal 15. The inner roll gimbal 12 for example, may only have a limited freedom of plus or minus 25° from a predetermined point before it strikes one of the stops 13 or 14. The inner roll gimbal 12 supports a gyroscopically stabilized table 16 having a plurality of gyroscopes (not shown) mounted thereon as described in detail in the aforementioned U.S. Patent No. 2,591,697. The table 16 is universally suspended for freedom about three mutually perpendicular axes.

It is advantageous to use a torque motor 20 for driving the outer gimbal 11 because of its excellent dynamic response characteristics, preferably, by means of a direct drive, i.e. the armature of the torque motor 20 directly connected to a trunnion 21 of the outer gimbal 11. However, torque motors do not experience a velocity limit as do more conventional servomotors. Further, the servo error signals from pick-off 22, which will be explained more fully subsequently, that energize the torque motor 20 to drive the outer gimbal 11 during the 180° reversal period have a magnitude that causes the torque motor servo system to operate saturated for substantially the entire reversal period.

Figure 2:
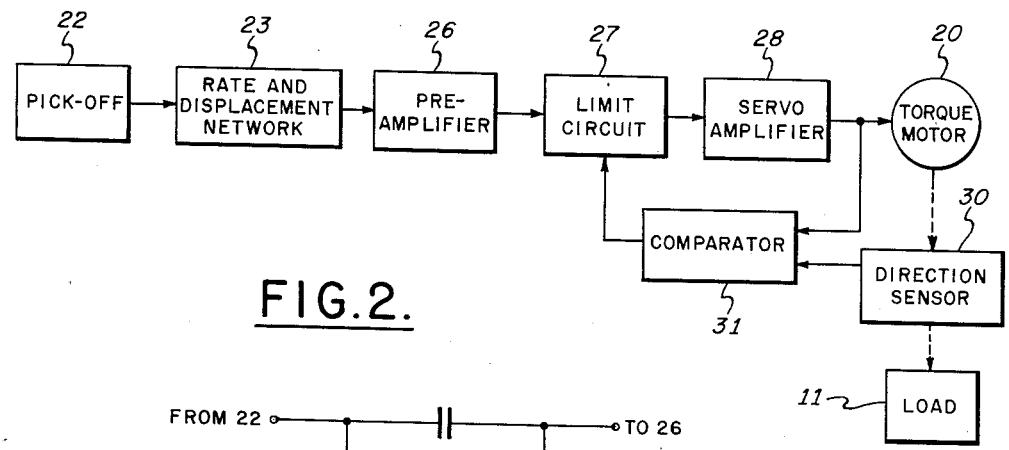
Fig. 2 is a block diagram of a servo system incorporating the present invention.
Figure 3:
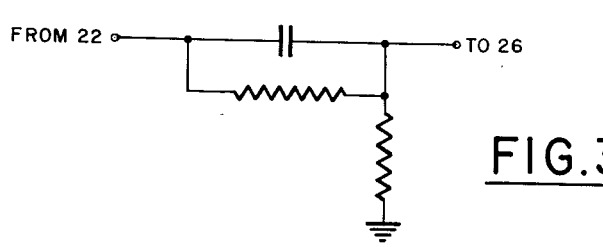
Fig. 3 is an electrical schematic of a typical rate and displacement circuit.

The present invention provides means for limiting the acceleration torque to a predetermined magnitude over a first predetermined portion of the total distance travelled by the load while removing the limit for the decelerating torque over a second predetermined remaining portion of the total distance. As shown in Fig. 2 this is accomplished by means which limits the magnitude of the signal applied to the torque motor 20 when the polarity of the signal and the direction of rotation of the output shaft of the torque motor are in the same direction but not when they are in opposite directions. Referring to Figs. 1 and 2, a pick-off 22 is mounted with its stator on the pitch gimbal 15 and its armature mounted on the trunnion 24 of the inner roll gimbal 12 to provide a displacement error signal when the gimbal 12 is other than perpendicular to the gimbal 15. The displacement error signal has a magnitude and a polarity representative of the amount and direction of the deviation from perpendicular. The displacement error signal from the pick-off 22 is applied to a rate and displacement network 25 which provides a resultant rate and displacement error signal to a preamplifier 26. The rate and displacement network 25 is a conventional circuit and may include an R.C. network of the differentiating or phase lead type as shown in Fig. 3.

The preamplifier 26 is connected through a limit circuit 27 to a servo amplifier 28. The output of the servo amplifier 28 is connected to energize the torque motor 20. The output shaft of the torque motor 20 is connected to the trunnion 21 to drive a load which in this case is the outer roll gimbal 11. A direction sensing device 30 is connected to the output shaft of torque motor 20 or to trunnion 21 to provide a measure representative of the direction of rotation of the trunnion 21. A comparator device 31 is connected to be responsive to the output of the servo amplifier 28 and the direction sensor 30 to provide a signal to the limiter 27 depending upon the relative phase of the output signal of the servo amplifier 28 and the direction of rotation of the trunnion 21 in a manner to be explained.

In operation, when the pitch angle of the aircraft exceeds ±90°, the pick-off 22 goes from a stable to an unstable null because with respect to the pick-off 22, the torque motor 20 is now facing in the opposite direction. This causes the pick-off 22 to provide a displacement error signal which is utilized to rotate the outer roll gimbal 11, 180° in a manner to be explained to a new stable null position. The R.C. circuit of the network 25 senses the rate of change of the error signal and provides a rate error signal that leads the displacement error signal by 90° which can be seen more clearly with respect to Fig. 4 where the displacement error signal 32 is shown as a dash-dot line and the rate error signal 33 is shown as a dash line. The combination of the displacement signal 32 and the rate signal 33 from the network 25 produces a resultant error signal 34 shown as a solid line. As the displacement error signal 32 begins to decrease, the polarity of the rate signal 33 reverses and subtracts from the displacement signal 32 eventually causing the resultant signal 34 to reverse polarity at the zero crossover point 35.

During the period of 180° reversal, the magnitude of the resultant signal 34 causes the preamplifier 26 to be saturated at all times. The resultant signal as amplified by the preamplifier 26 and the servo amplifier 28 energizes the torque motor 20 to drive the outer gimbal 11 in a particular direction depending upon the polarity of the resultant signal 34. When the torque motor 20 drives the load in a direction commanded by the resultant signal 34 it may be said that the polarity of the resultant signal 34 is in phase with the direction of rotation of the load or outer gimbal 11. Under these conditions, the gimbal 11 will be accelerated.

Figure 4:
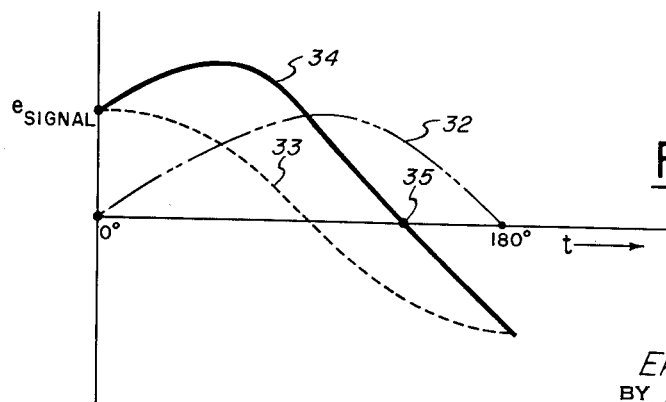
Fig. 4 is a graph showing the waveforms of the displacement, rate and resultant rate and displacement error signals.

To limit the accelerating torque to a predetermined magnitude the comparator 31 provides a signal to the limiter 27 when the polarity of the resultant signal 34 and the direction of rotation of the outer gimbal 11, as sensed by the direction sensor 30, are in phase. When they are in phase, the signal from the comparator 31 causes the limiter 27 to limit the magnitude of the resultant signal 34 thus effectively limiting the accelerating torque applied by torque motor 20 to the outer gimbal 11. The limit circuit 27 continues to limit the accelerating torque until the resultant signal 34 changes polarity at the zero crossover point 35 as shown in Fig. 4.

When the polarity of the resultant signal 34 changes, it energizes the torque motor 20 to apply a decelerating torque to the outer gimbal 11. Due to the inertia of the outer gimbal 11, it continues to rotate in the same direction as before and thus there is no change in the output of the direction sensor 30. The polarity of the resultant signal 34, however, is now in phase opposition to the direction of rotation of the outer gimbal 11 which condition is sensed by the comparator 31. Now, the comparator 31 provides a signal to the limiter 27 to remove the limit previously imposed. The unlimited resultant signal 34 energizes the torque motor 20 to provide maximum decelerating torque to quickly slow down the outer gimbal 11.

Figure 5:
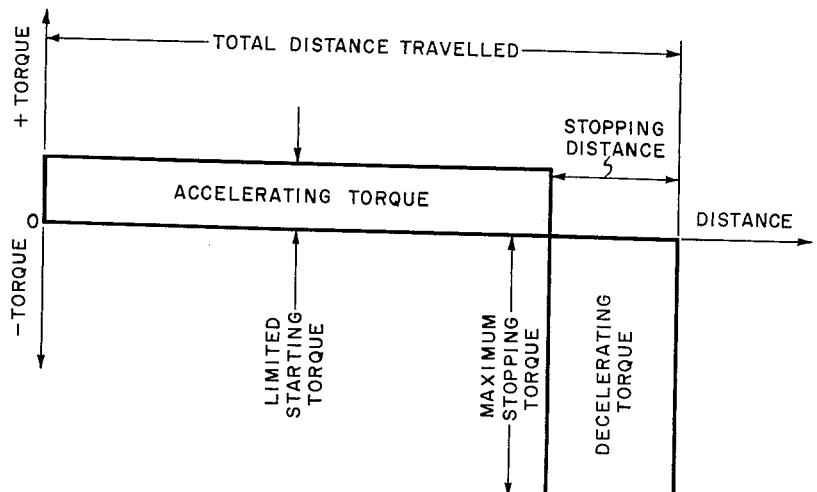
Fig. 5 is a graph of the torque applied by the torque motor versus the distance travelled by the load.

As shown in Fig. 5, by limiting the accelerating torque over a first predetermined portion of the total distance to be travelled and permitting maximum decelerating torque over the remaining distance to be travelled the outer gimbal 11 can be quickly rotated through precisely 180° without overshoot by designing the servo system in order that the integral of the accelerating torque is equal to the integral of the decelerating torque over the distance to be travelled. For example, when 180° total rotation of the outer gimbal 11 is desired without overshoot, the rate and displacement network 25 may be designed to have a zero crossover point 35 of the resultant signal 34 after 135° of gimbal rotation with the accelerating torque limited to 33⅓% of the maximum decelerating torque.

Figure 6:
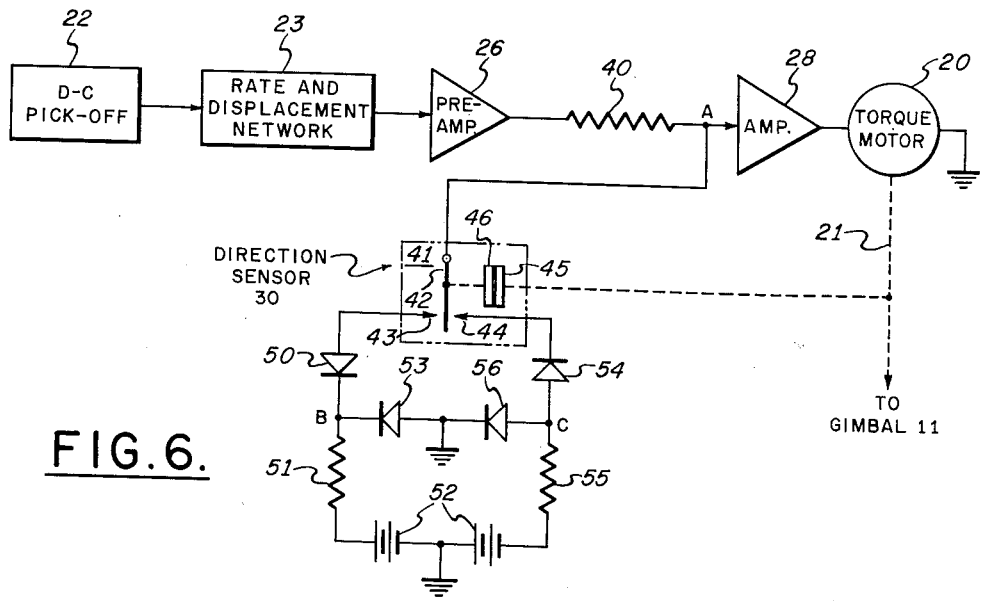
Fig. 6 is a schematic diagram of a preferred embodiment of the invention.

A preferred embodiment of the invention will now be described referring to Figs. 1 and 6. A D.C. pick-off 22 provides a D.C. error signal representative of the relative position of the inner roll gimbal 12 with respect to the pitch gimbal 15. The D.C. error signal is applied to a rate and displacement network 25 to produce a D.C. resultant error signal. The D.C. resultant error signal is applied to a D.C. preamplifier 26 which in turn is connected through a limiting resistor 40 and a junction A to a D.C. power amplifier 28. The amplifier 28 is connected to energize a D.C. torque motor 20. The output shaft of the torque motor 20 is connected to trunnion 21 to drive the outer roll gimbal 11 as shown in Fig. 1.

To provide a measure representative of the direction of rotation of the outer gimbal 11, a friction switch 41 has its contact arm 42 mounted on trunnion 21 for rotation therewith. Depending upon the direction of rotation, the contact arm 42 contacts either the contact 43 or the contact 44. The junction A is connected to the contact arm 42.

Figure 7:
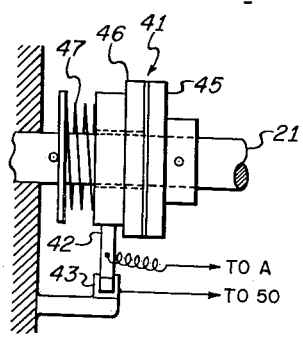
Fig. 7 is a detailed schematic view of the friction switch of Fig. 1.

A preferred embodiment of the friction switch 42 is shown in detail in Fig. 7. It comprises two cooperating friction discs 45 and 46. Friction disc 45 is rigidly connected to the trunnion 21 for rotation therewith. Friction disc 46 has a central aperture through which trunnion 21 protrudes without touching the disc 46. A helical spring 47 applies a resilient force to the disc 46 to hold the mating surfaces of discs 45 and 46 in contact. The contact arm 42 is connected to the disc 46 and is cooperative with the fixed contacts 43 and 44, the latter being shown in Fig. 6.

When the trunnion 21 rotates, the resilient force applied by the spring 47 to disc 46 causes discs 45 and 46 to rotate together until the contact arm 42 abuts against one of the contacts 43 and 44 depending upon the direction of rotation. As the trunnion 21 continues to rotate, disc 45 rotates with it but due to the low resilient force applied by the spring 47, disc 46 slips relative to disc 45 maintaining the contact arm 42 engaged against one of the contacts 43 or 44. The torque produced by the disc 46 slipping relative to the disc 45 is very small relative to the torque exerted by the torque motor 20 and does not disturb the inertial characteristics of the stable reference 10.

Referring again to Fig. 6, the contact 43 is connected to the anode of a diode rectifier 50 while its cathode is connected through a junction B and a dropping resistor 51 to the positive terminal of a constant D.C. source 52. A Zener diode 53 has its cathode connected to the junction B while its anode is connected to ground potential.

The contact 44 is connected to the cathode of a diode rectifier 54 while its anode is connected through a junction C and a dropping resistor 55 to a negative terminal of the constant D.C. source 52 which may be, for example, a 23 volt battery. A Zener diode 56 has its anode connected to the junction C while its cathode is connected to ground potential. The potential at junctions B and C for example may be +6 volts and −6 volts respectively as established by the Zener characteristics of the Zener diodes 53 and 56, respectively, which permit reverse conduction and act as voltage regulators at the aforementioned potentials.

Assuming a resultant error signal having a positive polarity applied to the preamplifier 26, the torque motor 20 will drive the outer gimbal 11 in a direction to cause the contact arm 42 to engage the contact 43. When the potential at junction A exceeds the potential at junction B by a slight amount, rectifier 50 will conduct to pass current from junction A to junction B. The Zener diode 53 will prevent the potential from rising above 6 volts, thus limiting the signal applied to the power amplifier 28 to +6 volts and the torque motor 20 will therefore accelerate the outer gimbal 11 at a limited accelerating torque. When the polarity of the resultant error signal changes at the zero crossover point, for example after 135° of rotation of the gimbal 11 rectifier 50 no longer conducts and acts to block the flow of current from junction A to junction B. Since the contact arm 42 continues to engage the contact 43 and the rectifier 50 is poled to prevent conduction when the signal at junction A is negative, the negative resultant error signal is unlimited as applied to the power amplifier 28 and thus energizes the torque motor 20 to provide a maximum decelerating torque to the outer gimbal 11. As explained above with reference to Fig. 5, the limited accelerating torque, for example, equivalent to +6 volts, is applied over a first predetermined distance, such as 135°, while the maximum decelerating torque, for example, equivalent to −18 volts, is applied over the remaining distance to be travelled, 45°, by the outer gimbal 11 in order that the outer gimbal 11 will be quickly rotated to and brought to rest at 180° of rotation, for example.

Assuming a resultant error signal having a negative polarity, the torque motor 20 will drive the outer gimbal 11 in order that the contact arm 42 engages the contact 44. Then in a manner similar to that explained above the negative resultant error signal is prevented from going more negative than −6 volts for example, by means of the conducting path from the junction A to the junction C through the rectifier 54 thence from the junction C to ground through the Zener diode 56. When the resultant error signal changes its polarity at its zero crossover point, rectifier 54 prevents conduction from junction A to junction C, and the magnitude of the positive resultant error signal is unlimited thereby permitting the outer gimbal 11 to be quickly rotated in the opposite direction and brought to rest at exactly 180° by matching the integral of the limited accelerating torque against the integral of the unlimited decelerating torque as described with respect to Fig. 5.

It will be appreciated that the sum of the accelerating torque may be balanced against the sum of the decelerating torque in a number of ways. For example, the accelerating torque may be limited to a first predetermined amplitude over a first predetermined distance with the decelerating torque limited, instead of unlimited as explained above, to a second predetermined amplitude over a second predetermined remaining distance. Further the first and second predetermined distances may be varied by varying the magnitude and phase of the rate error signal with respect to that of the displacement error signal by varying the parameters of the rate and displacement network 25, for example.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a servo system for driving a load a predetermined distance, a torque motor connected to drive said load, means for providing an error signal to energize said torque motor, and means responsive to said error signal and to the direction of movement of said load for limiting the effectiveness of said error signal over a first predetermined portion of said distance when said error signal and said direction of movement of said load are in phase and for removing said limit over the remaining portion of said distance when said error signal and said direction of movement are out of phase in order that the integral of the accelerating torque applied to said load over said first portion of the distance is equal to the integral of the decelerating torque applied to said load over said remaining portion of the distance.

2. In a position control system for driving a load a predetermined distance, a torque motor connected for driving said load, means for providing an error signal to energize said torque motor, and means responsive to said error signal and to the direction of movement of said load for limiting said error signal to a first predetermined magnitude over a predetermined portion of said distance when said error signal and said direction of movement of said load are in phase and for limiting said error signal to a second predetermined magnitude over the remaining portion of said distance when said error signal and said direction of movement are out of phase in order that the integral of the accelerating torque applied to said load over said first portion of the distance is equal to the integral of the decelerating torque applied to said load over said remaining portion of the distance.

3. In a servo system for driving a load a predetermined distance, means for providing an error signal having a magnitude and polarity representative of the magnitude and direction of an error, means responsive to said error signal for providing a signal representative of the rate of change of said error signal, means for combining said signals to produce a resultant signal, a torque motor for driving said load, control means responsive to said resultant signal and connected to energize said torque motor, and means responsive to the polarity of said resultant signal and the direction of rotation of the torque motor for limiting the magnitude of said resultant signal when the polarity of said resultant signal and the direction of rotation of said torque motor are in phase over a first predetermined portion of said distance and for removing said limit when the polarity of said resultant signal and the direction of rotation of said torque motor are in phase opposition through the remaining portion of said distance in order that the sum of the accelerating torque over said first predetermined portion of said distance is equal to the sum of the decelerating torque over the remaining distance.

4. In a servo system for positioning a load a predetermined distance, pick-off means for providing an error signal having a magnitude and a polarity representative of the desired amount and direction of positioning of said load, rate circuit means for providing a signal proportional to the rate of change of said error signal, means for combining said error and rate signal to produce a resultant error signal, torque motor means for driving said load, and means including means connected between said combining means and said torque motor and responsive to the direction of rotation of said motor for limiting said resultant signal when the polarity of said resultant signal and the direction of rotation of said motor are in phase and for removing said limit when the polarity of said resultant signal and the direction of rotation of said motor are in phase opposition in order that the integral of the accelerating torque applied to the load over a first portion of said predetermined distance is equal to the integral of the decelerating torque applied to said load over the remaining portion of said distance.

5. In a system as claimed in claim 4 in which said last-mentioned means includes direction sensing means connected to be responsive to the direction of rotation of the torque motor, comparison means responsive to the polarity of said resultant signal and to said direction sensing means, and limiting means responsive to said comparison means for limiting the torque exerted by said torque motor when said polarity of said resultant signal and the direction of rotation of said torque motor are in phase and for removing said limit when the polarity of said resultant signal and the direction of rotation of said torque motor are out of phase.

6. In a system as claimed in claim 4 in which said last-mentioned means includes positively and negatively biased rectifying means, positive and negative voltage regulating means connected to said positively and negatively biased rectifying means respectively, and switching means connected to said load and responsive to said resultant signal for connecting said resultant signal to said positively biased rectifying means upon rotation of the load in one direction and to said negatively biased rectifying means upon rotation of the load in the other direction whereby said resultant signal is limited when the direction of rotation of said load and the polarity of said resultant signal are in phase and it is unlimited when they are in phase opposition.

7. A servo system for driving a gyroscope gimbal through a predetermined angle, signal generating means for providing an error signal having a magnitude and polarity representative of the desired amount and direction of rotation of said gimbal, R.C. circuit means for providing a signal representative of the rate of change of said error signal, combining means for providing a resultant signal representative of said error and rate signals having a predetermined zero crossover point, a torque motor connected to drive said gimbal, direction sensing means responsive to the direction of rotation of said gimbal for providing a measure accordingly, comparison means responsive to said resultant signal and to said measure, and limiting means responsive to said comparison means for limiting the torque applied to said gimbal when said resultant signal and said measure are in phase and for removing said limit when they are out of phase in order that the integral of the accelerating torque applied to said gimbal before said zero crossover point equals the integral of the decelerating torque applied to said gimbal after said point.

No references cited.